United States Patent
Kreth et al.

(10) Patent No.: US 6,934,999 B2
(45) Date of Patent: Aug. 30, 2005

(54) DUAL-ARM ARTICULATED HINGE FOR THE FRONT BONNET OF A MOTOR VEHICLE

(75) Inventors: Laszlo Kreth, Pfungstadt (DE); Ingo Renneisen, Hochheim (DE); Andreas Polz, Gelsenkirchen (DE); Peter Mrowka, Remscheid (DE)

(73) Assignees: Adam Opel AG, Ruesselsheim (DE); Edscha AG, Remscheid (DE)

( * ) Notice: Subject to any disclaimer, the term of this patent is extended or adjusted under 35 U.S.C. 154(b) by 101 days.

(21) Appl. No.: 10/485,121
(22) PCT Filed: Jul. 25, 2002
(86) PCT No.: PCT/DE02/02727

§ 371 (c)(1),
(2), (4) Date: Jul. 2, 2004

(87) PCT Pub. No.: WO03/012233

PCT Pub. Date: Feb. 13, 2003

(65) Prior Publication Data

US 2004/0232729 A1 Nov. 25, 2004

(30) Foreign Application Priority Data

Jul. 28, 2001 (DE) .......................................... 101 36 897

(51) Int. Cl.⁷ .......................... E05D 11/00; B62D 25/12
(52) U.S. Cl. ............... 16/222; 296/193.11; 296/187.04; 296/187.09; 180/69.21
(58) Field of Search ....................... 296/193.11, 187.04, 296/187.09, 187.03, 76; 180/69.21, 274; 16/222

(56) References Cited

U.S. PATENT DOCUMENTS 3,643,755 A * 2/1972 Gionet et al. ............. 180/69.21
6,257,657 B1 * 7/2001 Sasaki .................... 296/187.09

FOREIGN PATENT DOCUMENTS

DE 19712961 * 10/1998
WO 00/69709 * 11/2000

* cited by examiner

*Primary Examiner*—Joseph D. Pape
(74) *Attorney, Agent, or Firm*—Davidson, Davidson & Kappel, LLC

(57) ABSTRACT

A double-armed hinge for use in a motor vehicle, includes a first bar for fastening to a front bonnet of said motor vehicle, a second bar for fastening to a body of said motor vehicle, a first arm, a second arm, and a thrust piece. At least one of said first arm and said second arm is constructed in two parts and includes a first strut and a second strut. The thrust piece thrust piece is applied to one of said first strut and said second strut. The thrust piece includes a head configured to grip behind the first or second strut. The first and second struts are pivotably connected to each other by a connecting joint and rigidly braced to each other by a connection device. The connecting device yields under a given load so that, under a sudden load that exceeds the given load, the connection device breaks and the first and second bars come closer to each other substantially without resistance.

7 Claims, 1 Drawing Sheet

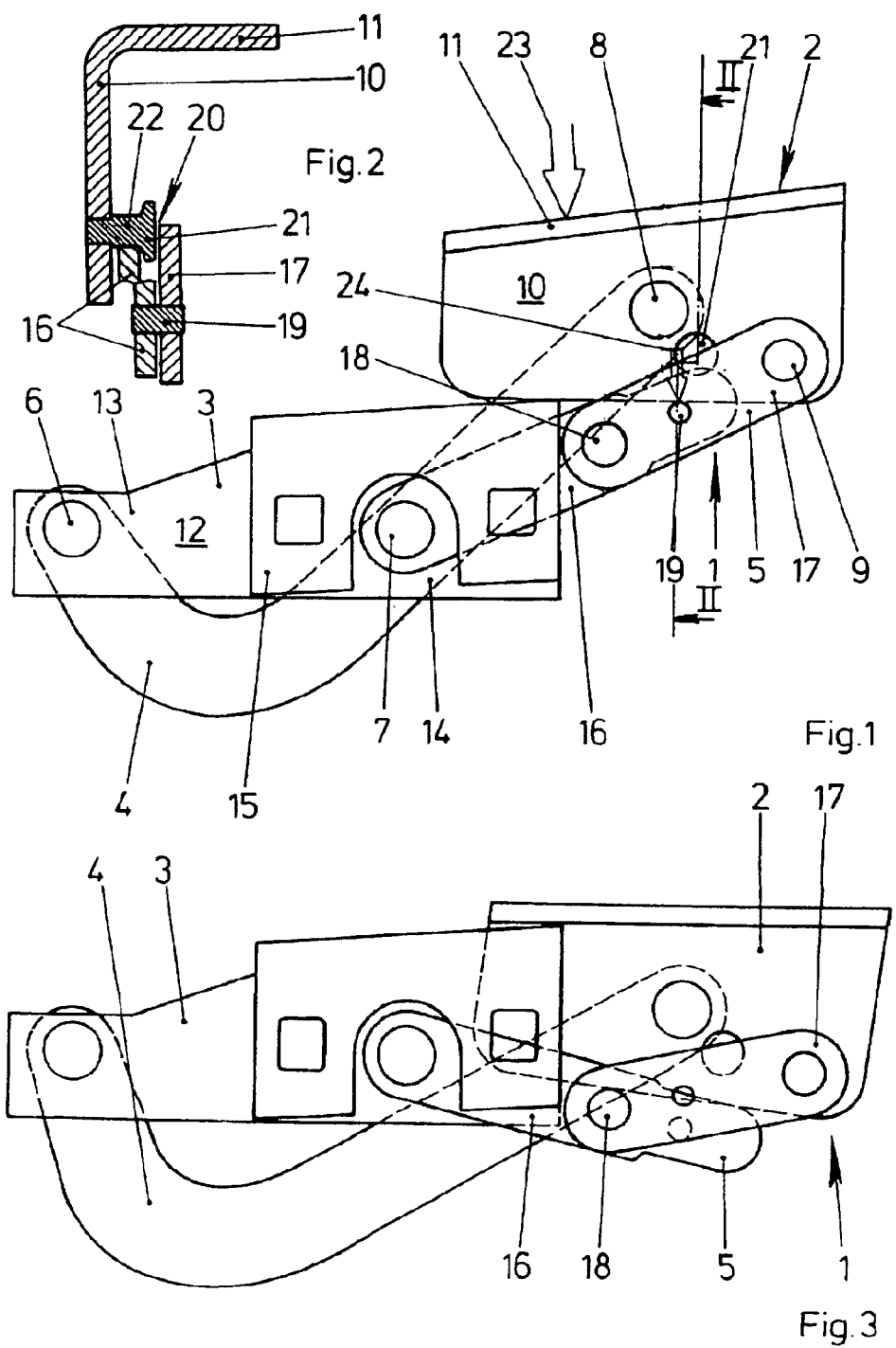

DUAL-ARM ARTICULATED HINGE FOR THE FRONT BONNET OF A MOTOR VEHICLE

The invention relates to a double-armed hinge for the front hood of a motor vehicle with a first and a second arm between a bar connected to the front hood and a bar connected to the body.

Such hinges come to use in manifold modes. A very schematic illustration can be seen from DE 197 12 961. The bottom ends of the arms are connected to the body by a bar and the upper ends to the front hood by a bar in respective joints. Since the arms are differently long and the joint axes at the top and at the bottom show different distances, the front hood is displaced when swinging up at the same time upward and forward. With other words: the pivot axis of the front hood passes through a path which is defined by the hinge geometry.

For the construction of a hinge for a front hood, care has further to be taken that the front hood is designed to yield to a certain amount, such that a pedestrian who is seized by a vehicle and impacts with his body and head onto the front hood is injured to a less possible amount. The restrictions following therefrom which have to be considered during the construction are checked using defined head-impact simulations. During these experiments, the deceleration of a simulation head is measured. From the chronological course of the deceleration, the so called HIC value can be determined, the definition thereof being available from the technical literature, and which should exceed 1,000 to fulfill certain obligations.

Very critical are head impacts on the front hood in the region of the hinges, since at this place a connection of the front hood to the body is provided which cannot be designed as yielding that the preset HIC value can fall short of. In the already cited laid-open publication, there is proposed to provide the bar at the body as a bracket being pivotable upwards. The bracket is, in case of an impending collision with a pedestrian, positioned by a prestressed spring in a wedge-type manner. On the one hand, the path along which the impacting head can reduce its kinetic energy is extended. On the other hand, the spring rate defines quiet exactly the resistance which causes the head deceleration. But it is problematic that it is extremely difficult to ensure that the front hood is lifted in the correct moment. Further, a deceleration corresponding to a spring characteristic is not necessarily optimal in view of obtaining as low an HIC value as possible.

SUMMARY OF THE INVENTION

An object of the present invention is to construct a double-armed hinge in such a manner that in case of a head impact on a front hood in the region of the hinges the injuries are as reduced as possible, i.e. that the HIC value in a simulation measures, if possible, under 1,000.

The present invention provides a double-armed hinge for use in a motor vehicle, that includes a first bar for fastening to a front bonnet of the motor vehicle, a second bar for fastening to a body of the motor vehicle, a first arm and a second arm. At least one arm is constructed in two parts and consists of two struts which are pivotably connected to each other by means of a connecting joint and rigidly attached to each other by means of a connection which yields under a given load so that, when the connection yields as a result of a sudden load, the bars come close to each other substantially without resistance.

This arrangement has the advantage that it is independent from a special activation of the protection mechanism, e.g. a prestressed spring. The protection mechanism is moreover inherently present and does not need an external triggering burdened by accident sensitiveness and incertitude.

The cause of the deceleration achieved in this manner induces an HIC value under 1,000. Namely and first of all a relatively large deceleration is given before the connection of the struts cedes, but this is limited to a short time and therefor supportable for the impacting head. Afterwards, a phase of reduced deceleration is provided when, after ceding of the connection, the bars come close to each other without resistance. Not until the bars come together, a distinct deceleration happens which in view of its consequences for the head injury is no more significant, since the kinetic energy of the head has been reduced largely during the first impact of the head. The two-step deceleration generated in this manner delivers good HIC values.

The yielding can be achieved in different manners. E.g., a weakening in the material of the arms could be considered such that the arms bend through in response to a load. Systems have been proven as particular suitable where the yielding is achieved through a breaking of the connection. Therethrough, a non-ambiguous defined threshold load is achieved.

To realize such a site of fracture, the struts are designed in such a manner that they lie against each other, in over-lapping planar relationship, and in the overlap region comprise the connecting joint and have a shear pin passing through them. Such an assembly is easily to arrange and fulfils the foreseen function in non-ambiguous manner.

In order to transfer the impact forces in a defined manner onto the struts, a thrust piece is provided on the bar for mounting the front hood. Said thrust piece can be applied to one of the struts of the two-part arm and induces the impact forces acting upon the front hood on a defined point of the strut in a distance of the jointed connection with the other strut such that the shear pin which has a different distance to the joint is loaded upon at a predetermined ratio with respect to the impact force. The arrangement of the thrust piece occurs in such a manner that it is moved away from the two-part arm during swinging up of the front hood.

In a more general manner, the thrust piece can be applied directly to the two-part arm when the front hood is closed, wherethrough the thrust piece has, at the same time, the function to define the closed position of the hinge.

This function can also be performed by another abutment. In this case, the thrust piece will have a certain distance to the strut such that it hits in case of a head impact with a momentum onto the strut having as consequence that the shearing process is jerkily achieved and only necessitates very short time such that the transfer to the phase with reduced deceleration is even more clearly defined.

A particular simple embodiment of the thrust piece is achieved when it is designed as a bolt which protrudes laterally from the bar for attachment of the front hood.

In order to avoid slipping of the thrust piece from the strut during the transmission of the impact force, it is provided that the thrust piece comprises a head which penetrates into a gap between the two struts and in this manner grips behind the loaded strut.

In order to realise the gap, the strut to which the thrust piece can be applied comprises an end portion which is offset with respect to the other strut.

BRIEF DESCRIPTION OF THE DRAWINGS

To illustrate the invention, an embodiment of the invention will subsequently be explained in more detail with respect to the three drawings.

FIG. 1 shows a side view of a hinge according to the invention in the normal position.

FIG. 2 shows a cut along line II—II of FIG. 1.

FIG. 3 shows the hinge according to FIG. 1 after accomplishing a head impact simulation test.

DETAILED DESCRIPTION

First, reference is made to FIGS. 1 and 2. FIG. 1 shows in a side view a double-armed hinge 1. Said hinge consists of an upper bar 2 and a lower bar 3. The upper bar is bolted together, welded together or designed in one part with a front hood not shown. The lower bar is bolted together with a body strut not shown. The two bars 2, 3 are pivotably connected with each other with a long arm 4 and a short arm 5. For this purpose, each arm 4, 5 is pivotably beared as well to the upper as to the lower bar in joints 6, 7, 8, 9. The upper bar 2 consists of a vertical portion 10 for receiving the joints 8, 9 and a horizontal portion 11 to which the front hood is fastened. The lower bar 3 comprises also a vertical portion 12 having two regions 13, 14 being offset with respect to each other in a right angle to the image plane, wherein the one region 13 to which the long arm 4 is pivotably beared in a joint 6 lies in the same plane as the vertical portion 10 of the upper bar 2, and the other region 14 receiving the joint 7 for the short arm 5 is offset with respect thereto. On the last cited region 14 is a fixed clamp 15 for fastening the lower bar 3 to a body strut.

According to the illustration the long arm 4 is provided behind the vertical portions 10 while the short arm 5 lies in front of it. The short arm 5 is embodied in two parts and consists of two struts 16, 17 which are connected with each other by a connecting joint 18 in a pivotable manner. This connecting joint 18 is provided approximately at half distance between the two joints 7, 9 at the bars 2, 3. The lower strut 16 which is pivotably connected with the lower bar 3 is extended over the connecting joint 18 and lies in this region against the upper strut 17 in a planar relationship, wherein in this region the two struts 16, 17 are traversed by a shear pin 19.

The lower strut 16 is extended over the shear pin 19 and is offset in steps from the upper strut 17 which is particularly good to be seen in FIG. 2. Therethrough, a gap 20 is designed between the two struts 16, 17.

A head 21 of a thrust piece 22 designed as a bolt penetrates into this gap 20, serving as thrust piece for transmitting of forces onto the short arm 5. The thrust piece 22 is firmly attached to the vertical portion 10 of the upper bar 2 and protrudes normally.

The shear pin 19 connects the two struts 16, 17 of the short arm 5 in rigid manner such that it operates like a single-piece arm and the double-armed hinge 1 works as designed for. Even facing static forces in a normal range, the forces which are urged onto the short arm 5 by the thrust piece 22 are not that high that this rigid connection would brake up.

In case of a head impact the exercised forces exceed the shear limit at which the shear pin 19 shears such that the connection is released. When namely a hit force according to arrow 23 is exercised on the upper bar 2, it is transferred via the thrust piece 22 onto the short arm 5 and from there according to the effective lever arms according to arrow 24 onto shear pin 19.

In the shown embodiment, the thrust piece 22 is applied directly against the lower strut 16 and the short arm 5. A shorter distance can be provided here also to let the force transmission be achieved with a certain impetus. The head 21 gripping behind lower strut 16 prevents that the thrust piece 22 slides in doing so from the strut 16 which would avoid a force transmission.

When within a sudden load a threshold load is reached where the shear pin 19 shears, the rigid connection between the two struts 16, 17 is suspended and these can rotate with respect to each other around connecting joint 18. Therethrough it is possible that the upper bar 2 sags downward, as shown in FIG. 3. In doing so, the hinge opposes no resistance against the movement such that the head deceleration results only from a deformation of the hood or of a deformation of the supporting elements outside the hinge, respectively. But these are designed in a manner that the deceleration is only reduced. Only when the hinge is completely collapsed, as shown in FIG. 3, and the upper strut 17 lies onto the lower strut 16, a rigid connection to the body is produced again such that again high decelerations occur. It results accordingly a two-step deceleration course in total, namely a first step until the shearing of the shear pin 19 and second step after collapsing of the hinge, where in total a reduced HIC value can be expected.

What is claimed is:

1. A double-armed hinge for use in a motor vehicle, comprising:
   a first bar for fastening to a front bonnet of said motor vehicle;
   a second bar for fastening to a body of said motor vehicle;
   a first arm and a second arm wherein at least one of said first arm and said second arm is constructed in two parts and comprises a first strut and a second strut; and
   a thrust piece applied to one of said first strut and said second strut;
   wherein said thrust piece includes a head configured to grip behind said one of said first strut and said second strut, and
   wherein said first strut and said second strut are pivotably connected to each other by a connecting joint and rigidly braced to each other by a connection device which yields under a given load so that, under a sudden load that exceeds the given load, the connection device breaks and the first and second bars come closer to each other substantially without resistance.

2. The double-armed hinge according to claim 1, wherein said head penetrates into a gap between said first strut and said second strut.

3. The double-armed hinge according to claim 2, wherein, to form said gap, said one of said first strut and said second strut comprises an end portion which is offset with respect the other of said first strut and said second strut.

4. The double-armed hinge according to claim 1, wherein in a closed position of said front bonnet, a space is provided between said one of said first strut and said second strut and said thrust piece.

5. The double-armed hinge according to claim 1, wherein said first strut and said second strut lie against each other in overlapping planar relationship and wherein said connection comprises a shear pin passing through said first strut and said second strut in an overlap region.

6. The double-armed hinge according to claim 1, wherein said thrust piece is a bolt, and wherein said bolt protrudes laterally from said first bar.

7. The double-armed hinge according to claim 1, wherein said first arm and said second arm each comprise a first joint for bearing in said first bar and a second joint for bearing in said second bar.

* * * * *